United States Patent [19]

Takeuchi et al.

[11] Patent Number: 4,669,268

[45] Date of Patent: Jun. 2, 1987

[54] MASTER CYLINDER-REDUCING VALVE ASSEMBLY

[75] Inventors: Hiroo Takeuchi, Asashina; Nobuaki Hachiro, Ueda, both of Japan

[73] Assignee: Nissin Kogyo Kabushiki Kaisha, Nagano, Japan

[21] Appl. No.: 645,727

[22] Filed: Aug. 30, 1984

[30] Foreign Application Priority Data

Sep. 2, 1983 [JP] Japan .................................. 58-136186
Sep. 2, 1983 [JP] Japan .................................. 58-136187

[51] Int. Cl.$^4$ ............................................. B60T 11/34
[52] U.S. Cl. ..................................... 60/591; 303/6 C; 188/349
[58] Field of Search ..................... 60/591; 188/349; 303/6 C; 137/493, 505.25, 515.7, 454.6

[56] References Cited

U.S. PATENT DOCUMENTS

| | | | |
|---|---|---|---|
| 2,770,948 | 11/1956 | Porter | 60/591 |
| 3,493,270 | 2/1970 | Doerfler | 60/591 |
| 3,945,686 | 3/1976 | Orzel | 303/6 C |
| 4,170,386 | 10/1979 | Shutt | 60/591 |
| 4,213,655 | 7/1980 | Brademeyer | 60/591 |
| 4,433,872 | 2/1984 | Parker et al. | 303/22 A |
| 4,475,339 | 10/1984 | Inove | 60/591 |
| 4,477,122 | 10/1984 | Hayashida | 60/591 |

*Primary Examiner*—Samuel Scott
*Assistant Examiner*—Allen J. Flanigan

*Attorney, Agent, or Firm*—Armstrong, Nikaido, Marmelstein & Kubovcik

[57] ABSTRACT

A master cylinder-reducing valve assembly has a master cylinder and a reducing valve for transmitting output hydraulic pressure from the master cylinder to a rear wheel brake at a reduced level. The reducing valve includes a valve housing provided on the master cylinder and having an inlet communicating with the output port of the master cylinder and an outlet communicating with a rear wheel brake. A pressure receiving piston is slidably received in the valve housing to divide the interior of the housing into an input hydraulic chamber communicating with the inlet and an output hydraulic chamber communicating with the outlet. The pressure receiving piston has a communication bore connecting between the input and output hydraulic chambers. A valve member is disposed in the input hydraulic chamber to open and close the communication bore. A valve spring is received in the valve housing and biases the valve member toward the pressure receiving piston. A pressure regulatng spring is also received in the valve housing for biasing the pressure receiving piston away from the valve member. The valve housing comprises a first half part having the inlet and integral with the master cylinder, and a second half part having the outlet and screwed to the first half part. The second half part has a valve cylinder fitted into its opening adjacent the first half part. A valve cylinder houses the valve member and the valve spring loaded between the valve member and the valve cylinder.

9 Claims, 9 Drawing Figures

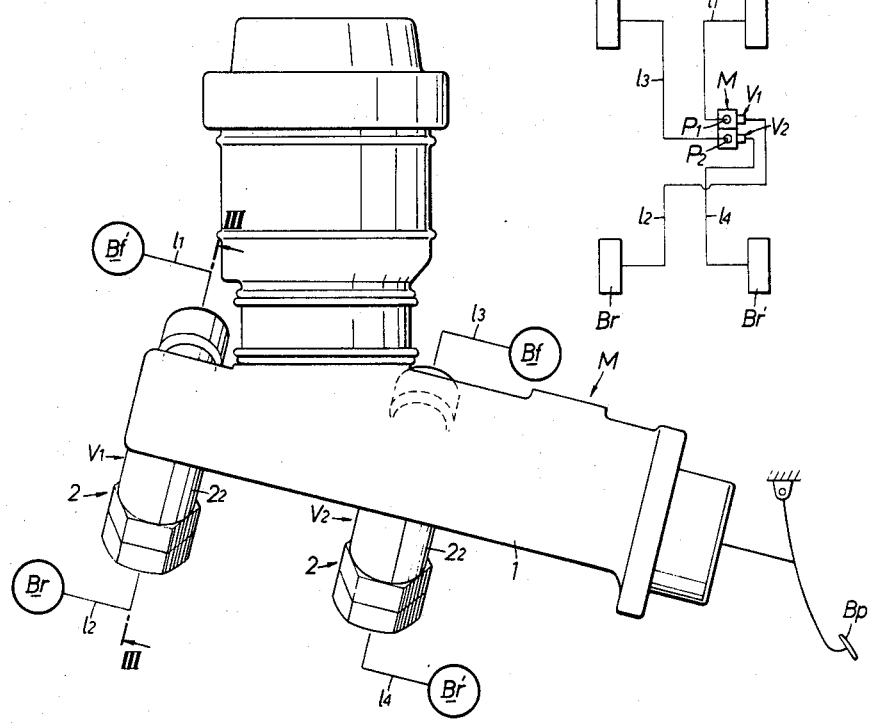

MASTER CYLINDER-REDUCING VALVE ASSEMBLY

BACKGROUND OF THE INVENTION

1. Field of the Invention

The present invention relates to a master cylinder-reducing valve assembly in which the output oil pressure of a master cylinder is transmitted to a rear wheel brake through a reducing valve such that the rear wheel brake oil pressure is reduced at a predetermined ratio to the front wheel brake oil pressure, so that a highly effective braking is attained even if the load on the rear wheels is decreased due to a forward shifting of the load at the time of an abrupt braking.

2. Description of the Prior Art

In a known assembly of the kind described, the reducing valve is constituted by a valve housing having an inlet connected to the output port of the master cylinder and an outlet connected to a rear wheel brake, a pressure-receiving piston slidably received in the valve housing to divide the interior of the valve housing into an input hydraulic chamber communicating with the inlet and an output hydraulic chamber communicating with the outlet, the piston having a communication port through which both hydraulic chambers communicate each other, a valve member disposed in the input hydraulic chamber and adapted to open and close the communication port during pressure-reducing operation, a valve spring adapted to bias the valve member toward the pressure-receiving piston, and a pressure regulating spring which is adapted to bias the pressure-receiving piston away from the valve member.

This reducing valve is assembled by suitably mounting the valve member, valve spring, pressure-receiving piston and the pressure regulating spring in the valve housing and thereafter securing the valve housing through screw means to the master cylinder. For obtaining a different pressure-reducing characteristics, therefore, the reducing valve as a whole has to be replaced by another uneconomically.

SUMMARY OF THE INVENTION

Accordingly, an object of the invention is to provide a master cylinder-reducing valve assembly in which a pressure-receiving piston and a pressure regulating spring, which the inventors noted are primary constituents for determining the pressure-reducing characteristics such as the pressure reduction ratio, pressure reduction starting pressure and so forth, are constructed as a unit (hereinunder referred to as "piston-spring unit"), and a plurality of such units having different characteristics are previously prepared and selectively fitted to a common sub-assembly consisting of a valve member and a valve spring, thereby attaining a greater economy in the work of changing pressure-reducing characteristics, as well as realizing an exact positioning of the valve member with respect to the pressure-receiving piston.

Another object of the invention is to provide a master cylinder-reducing valve assembly of the type mentioned above, wherein the valve member and the valve spring are united with each other by incorporating those components into a common valve cylinder.

Still another object of the invention is to provide a master cylinder-reducing valve assembly of the type mentioned above, wherein the valve cylinder can be reliably fitted and coupled to the piston-spring unit by the resilient force of a biasing spring.

A further object of the invention is to provide a master cylinder-reducing valve assembly of the type mentioned above, wherein the biasing spring and the valve spring are united with each other.

A still further object of the invention is to provide a master cylinder-reducing valve assembly of the type described above, wherein the biasing spring and the valve cylinder are constructed as a unit.

To these ends, according to an aspect of the invention, there is provided a master cylinder-reducing valve assembly having a master cylinder and a reducing valve for transmitting an output hydraulic pressure from the master cylinder to a rear wheel brake at a reduced level, the reducing valve comprising: a valve housing mounted on the master cylinder and having an inlet communicating with an output port of the master cylinder and an outlet communicating with the rear wheel brake; a pressure receiving piston slidably received in the valve housing so as to divide an interior of the valve housing into an input hydraulic chamber communicating with the inlet and an output hydraulic chamber communicating with the outlet, the pressure receiving piston having a communication bore for connection between the input and output hydraulic chambers; a valve member disposed in the input hydraulic chamber and adapted to open and close the communication bore; a valve spring for biasing the valve member toward the pressure receiving piston; and a pressure regulating valve for biasing the pressure receiving piston away from the valve member, wherein the valve housing consists of a first half part having the inlet and formed integral with the master cylinder, and a second half part having the outlet and screwed to the first half part, the second half part having a valve cylinder adapted to be fitted into an opening provided thereon on a side closer to the first half part, the valve cylinder accommodating therein the valve member and the valve spring compressed between the valve member and the valve cylinder, the second half part accommodating therein the pressure receiving piston and the pressure regulating spring compressed between the pressure receiving piston and the second half part.

According to another aspect of the invention, the valve spring consists of a frusto-conical coiled spring having a small-diameter end engaging with the valve member and a large-diameter end engaging in an annular retaining groove formed in an inner peripheral surface of the valve cylinder.

According to still another aspect of the invention, the valve housing consists of a first half part having the inlet and formed integral with the master cylinder, and a second half part having the outlet and screwed to the first half part, the second half part having a valve cylinder adapted to be fitted into an opening provided thereon on a side closer to the first half part, the valve cylinder accommodating therein the valve member and the valve spring compressed between the valve member and the valve cylinder, the second half part accommodating therein the pressure receiving piston and the pressure regulating spring compressed between the pressure receiving piston and the second half part, and wherein a biasing spring for pressing the valve cylinder against the second half part is compressed between the first half part and the valve cylinder.

According to a further aspect of the invention, the biasing spring consists of a plurality of resilient tabs which are formed integrally with the valve cylinder when the valve cylinder is molded from synthetic resin.

According to a still further aspect of the invention, the biasing spring consists of a coiled spring having one end connected to the large-diameter end of the valve spring.

According to a still further aspect of the invention, the biasing spring and the valve spring are formed integrally and in symmetry with each other with respect to a portion where they are connected to each other.

According to the invention, therefore, the reducing valve can be constructed by fitting a valve cylinder to the second half part provided with the pressure-receiving piston and the pressure regulating spring and, after mounting the valve member and the valve spring in the valve cylinder, securing the second half part to the first half part. It is thus possible to obtain reducing valves having a variety of pressure reducing characteristics simply by replacing the second half part by another while making common use of the valve member and the valve spring. Consequently, a greater economy is attained when compared with the conventional arrangement which requires a replacement of the reducing valve as a whole. Furthermore, the valve member can be positioned correctly with respect to the pressure-receiving piston and the gap between these two members can be controlled by fitting the valve cylinder to the second half part. As a result, the gap is formed at a high dimensional precision and the pressure at which the pressure reduction is commenced is obtained in a very accurate manner.

In addition, since the valve member and the valve spring are not incorporated in the second half part, the pressure-receiving piston and the pressure adjusting spring become accessible without requiring the demounting and mounting of the valve member and other associated parts, so that the inspection and maintenance of the pressure-receiving piston can be facilitated advantageously.

Furthermore, since the valve member and the valve spring are incorporated as a unit in the valve cylinder, the valve member and other parts are prevented from coming off from the valve cylinder, so that any accident such as dropping, damaging and losing of the valve member and so forth is avoided advantageously. In addition, the handling of the valve member and other parts is facilitated to permit an easy replacement of the piston-spring unit.

The mounting of the valve spring in the valve cylinder eliminates any undesirable twisting of the valve spring when screwing the second half part to the first half part. In addition, since the valve spring has a frusto-conical form, it can be securely compressed between an annular groove which is formed in the valve cylinder and the valve member.

The biasing spring acts to resiliently press the valve cylinder onto the second half part so that the valve cylinder can be fitted and connected to the second half part, i.e., the piston-spring unit.

It is to be noted also that, since the biasing spring is constituted by a plurality of resilient tabs formed integrally on the valve cylinder made of synthetic resin. This eliminates the necessity of separate provision of spring, posing a great advantage from the view point of economy.

By constructing the valve spring and the biasing spring in the form of a single coiled spring, the structure is simplified advantageously, while the positioning of the valve member and the valve cylinder is conducted easily by effectively utilizing the single coiled spring. In this case, the valve spring has a frusto-conical form so that it can be compressed easily between the valve member and an annular engaging groove on the valve cylinder.

Furthermore, by designing the valve spring and the biasing spring in symmetry with respect to the central portion at which these springs are connected to each other, these springs can be mounted easily without requiring specific directivity, thereby preventing misassembling.

These and other objects, features and advantages of the invention will become clear from the following description of some preferred embodiments when the same is read in conjunction with the accompanying drawings.

BRIEF DESCRIPTION OF THE DRAWINGS

FIG. 1 is a hydraulic circuit diagram of a dual-type hydraulic circuit of a hydraulic automotive braking system, incorporating a first embodiment of the master cylinder-reducing valve assembly in accordance with the invention;

FIG. 2 is a side elevational view of the first embodiment of the master cylinder-reducing valve assembly;

DESCRIPTION OF THE PREFERRED EMBODIMENTS

Some preferred embodiment of the invention will be explained hereinafter with reference to the accompanying drawings.

Referring to FIGS. 1 and 2, an automotive hydraulic braking system has two sub-systems arranged in a diagonal form: namely a first sub-system including front and rear wheel brakes Bf,Br' and a second sub-system including front and rear wheel brakes Bf',Br. These two sub-systems are actuated by a common hydraulic actuator which is constituted by a tandem type master cylinder M which is provided with first and second reducing valves $V_1$ and $V_2$. The master cylinder M has a first output port $P_1$ to which are connected a hydraulic line $l_1$ leading to the right front wheel brake Bf and an input end of the first reducing valve $V_1$. An output end of the first reducing valve $V_1$ is connected to the left rear wheel brake Br through a hydraulic line $l_2$. On the other hand, to a second outlet port $P_2$ are connected a hydraulic line $l_3$ leading to the left front wheel brake Br and an input side of the second reducing valve $V_2$. An output side of the valve $V_2$ is connected to the right rear wheel brake Br' through a hydraulic line $l_4$.

Figure 3:
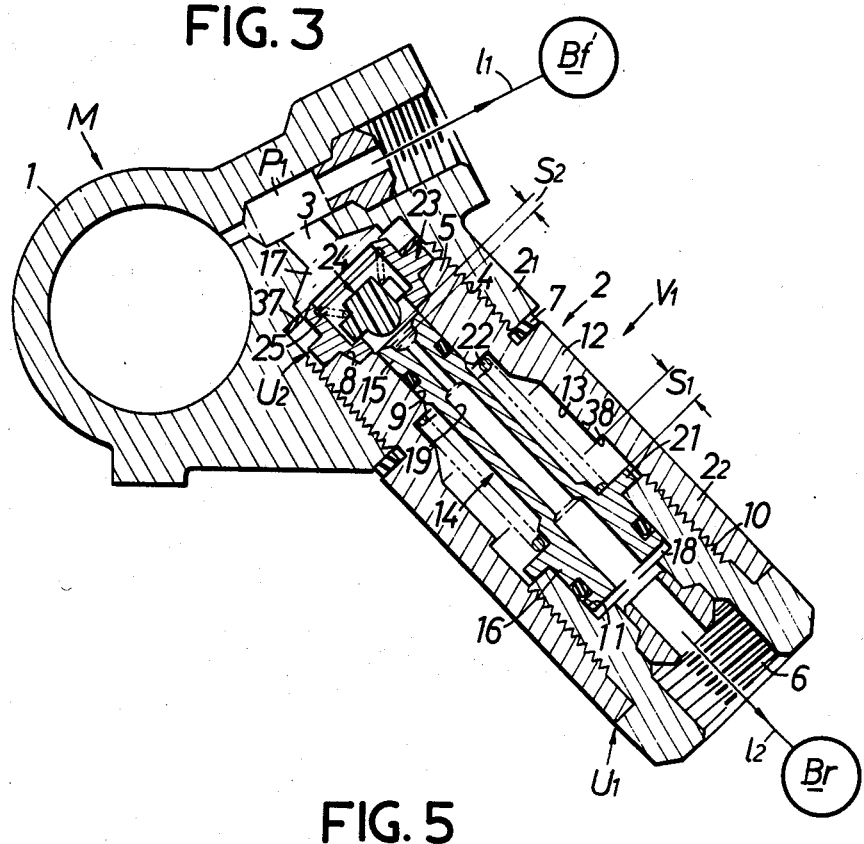
FIG. 3 is a sectional view taken along the line III—III of FIG. 2.
Figure 4:
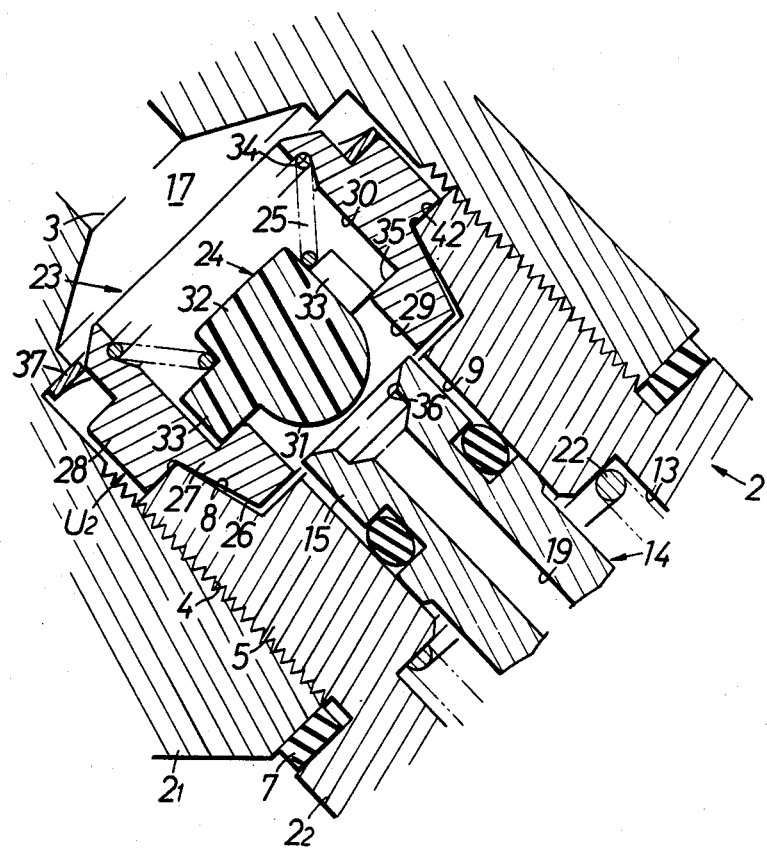
FIG. 4 is an enlarged sectional view of an essential part of the assembly.

The first and second reducing valve $V_1$ and $V_2$ have an identical construction so that the following description of the first reducing valve $V_1$ applies also to the second reducing valve $V_2$. As shown in FIGS. 3 and 4, the master cylinder M has a cylinder body 1 provided with a valve housing 2. The valve housing 2 comprises a cylindrical first half part $2_1$ having an inlet 3 communicating with the first output port $P_1$ and constructed integral with the cylinder body 1, and a cylindrical second half part $2_2$ having an externally threaded cylinder 5 engaging with an internally threaded bore 4 formed on the first half part $2_1$, the part $2_2$ being provided with an outlet 6 which is communicated with the left rear wheel brake Br through the hydraulic line $l_2$. A sealing member 7 is clamped between the first and second half parts $2_1$ and $2_2$.

The externally threaded cylinder 5 of the second half part $2_2$ is provided with a small-diameter cylinder bore 9 communicating with an end opening 8. At the same time, a large-diameter cylinder bore 11 communicating with the outlet 6 is formed in an outer end wall 10 of the part $2_2$. A spring receiving bore 13 is formed at a portion intermediate between the cylinder bores 9 and 11 in a peripheral wall 12 coaxially with these cylinder bores 9 and 11. A hollow pressure-receiving piston 14 has a small-diameter end 15 slidably received by the small-diameter cylinder bore 9 and a large-diameter end 16 slidably received by the large-diameter cylinder bore 11. Consequently, the interior of the valve housing 2 is divided into an input hydraulic chamber 17 between the small-diameter end 15 of the pressure-receiving piston 14 and the inlet 3 of the part $2_2$ and an output hydraulic chamber 18 between the large-diameter end 16 of the pressure-receiving piston 14 and the inner surface of the outer end wall 10. Both hydraulic chambers 17 and 18 communicate with each other through a communication bore 19 extending axially through the pressure-receiving piston 14. The output hydraulic chamber 18 also communicates with the outlet 6 to which is connected the hydraulic line $l_2$ leading to the left rear wheel brake Br.

A pressure regulating spring 22 is loaded between the end wall of the spring receiving bore 13 adjacent to the small-diameter cylinder bore 9 and a flange 21 on the inner end of the large-diameter end 16 of the pressure-receiving piston 14. In this state, a predetermined level of initial load is applied to the pressure regulating spring 22 so that the flange 21 is normally held in resilient contact with the open end surface of the large-diameter cylinder bore 11 by the force of the pressure regulating spring 22.

Thus, the second half part $2_2$, pressure receiving piston 14 and the pressure regulating spring 22 in combination constitute a piston-spring unit $U_1$.

The input hydraulic chamber 17 receives a valve member - valve spring unit $U_2$ (hereinunder referred to as valve-spring unit) which consists of a valve member 24 made of synthetic resin, a valve spring 25 and a metallic cylinder 23. The cylinder 23 has both ends opened and from these opened ends the valve member 24 and the valve spring 25 are incorporated into the cylinder at the time of assembly.

As shown in detail in FIG. 4, the valve cylinder 23 has a cylindrical portion 27 extending from its mid portion to one axial end thereof. The outer peripheral surface 26 of this cylindrical portion 27 is tapered such that the diameter thereof is decreased towards the above-mentioned axial end. In the cylindrical portion 27 are formed a small-diameter bore 29 opening at the reduced-diameter end of the cylindrical portion 27 and a large-diameter bore 30 communicating with the small-diameter bore 29.

Figure 5:
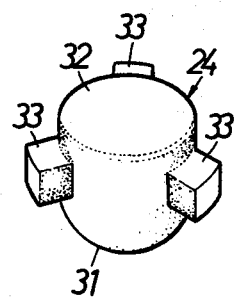
FIG. 5 is a perspective view of a valve member.

As will be seen from FIG. 5, the valve member 24 has a bullet-like main body 32 having a hemispherical end surface 31 and a plurality of engaging tabs 33 extending radially from the base end edge of the hemispherical end surface 31.

The valve member 24 is mounted in the valve cylinder 23 with the hemispherical end surface 21 and the engaging tabs 33 thereof being received, respectively, in the small-diameter bore 29 and the large-diameter bore 30. The valve spring 25 is constituted by a frusto-conical coiled spring the large-diameter end of which rests in an annular retaining groove 34 formed in the inner peripheral surface of the large-diameter bore 30. The small-diameter end of this coiled spring engages the base portions of the retaining tabs 33. In consequence, the valve spring 25 is compressed between the valve cylinder 23 and the valve member 24. The valve spring 25 exerts a resilient force to hold the engaging tabs 33 of the valve member 24 in contact with an annular step wall 35 formed between the large-diameter bore 30 and the small-diameter bore 29. The valve member 24 and the valve spring 25 are thus held in the valve cylinder 23. The frusto-conical cylindrical portion 27 of the valve cylinder 23 as having tapered peripheral surface 26 is fitted to a tapered inner peripheral surface defining the opening 8 of the second half part $2_2$. The valve cylinder 23 also has a flange 28 which contacts an end surface 42 of the opening 8. Consequently, the valve member 24 is correctly positioned with respect to a valve seat 36 which is formed on the end opening of the communication bore 19 formed in the pressure receiving piston 14. The valve cylinder 23 is pressed against the second half part $2_2$ by the resilient force produced by an annular wave-shaped biasing spring 37 which is loaded between the inner end wall of the input hydraulic chamber 17 and the flange 28. Thus, the valve cylinder 23 is mounted immovably in the input hydraulic chamber 17.

The pressure receiving piston 14 is normally biased away from the valve member 24 by the resilient force caused by the pressure regulating spring 22, so that a predetermined gap regulated by the flange 28 of the valve cylinder 23 exists between the valve member 24 and the valve seat 36.

The inside diameter of the small-diameter bore 29 in the valve cylinder 23 is so determined that the small-diameter bore 29 can loosely receive the extreme end of the small-diameter end 15 of the pressure receiving piston 14. The distance $S_1$ between the flange 21 of the pressure-receiving piston 14 and a step surface 38 on the wall of the spring receiving bore 13 serving as a stopper surface is determined to be greater than the distance $S_2$ between the valve member 24 and the valve seat 36. Consequently, the valve member 24 can be seated stably and without fail on the valve seat 36.

The second pressure reducing valve $V_2$ also has an output hydraulic chamber (not shown) communicating with the outlet to which is connected a hydraulic line $l_4$ leading to the right rear wheel brake Br'.

In operation of this embodiment, as driver depresses a brake pedal Bp to actuate the master cylinder M for braking operation, the pressurized oil is delivered from the first output port $P_1$ to the right front wheel brake Bf' through the hydraulic line $l_1$ thereby to activate the right front wheel brake Bf'. The pressurized oil is supplied also through the input hydraulic chamber 17 and the output hydraulic chamber 18 of the first reducing valve $V_1$ and through the hydraulic line $l_2$ to the left rear wheel brake Br thereby operating the latter. Meanwhile, the pressurized oil from the second output port $P_2$ is supplied through the hydraulic line $l_3$ to the left front wheel brake Bf to actuate the latter. At the same time, the pressurized oil from the second output port $P_2$ is delivered through the input and output hydraulic chambers of the second reducing valve $V_2$ and then through the hydraulic line $l_4$ to the right rear wheel brake Br' thereby actuating the latter.

In each of the first and second reducing valves $V_1$ and $V_2$, the pressure reducing operation is commenced when a predetermined hydraulic pressure is reached in its output chamber as a result of the rise of the output hydraulic pressure of the master cylinder M. The pressure reducing operation of only the first reducing valve $V_1$ will be described hereunder because the operation of the reducing valve $V_2$ is identical to that of the first reducing valve $V_1$. A differential-pressure force is applied to the pressure-receiving piston 14 in the counter direction to the force of the pressure regulating spring 22, due to the difference between the pressure receiving areas of the small-diameter end 15 and the large-diameter end 16 of the pressure-receiving piston 14. As a predetermined pressure is reached in the output hydraulic chamber, this differential pressure force exceeds the biasing force of the pressure regulating spring 22 so that the pressure receiving piston 14 is moved obliquely upwardly as viewed in FIG. 3, until the valve seat 36 on the small-diameter end 15 contacts the valve member 24. In this state, the communication bore 19 is closed so that the input hydraulic chamber 17 and the output hydraulic chamber 18 are disconnected from each other.

A further increase of the output hydraulic pressure from the master cylinder M causes the pressure in the input hydraulic pressure chamber 17 to rise thereby moving the pressure receiving piston 14 obliquely downwardly as viewed in FIG. 3. In consequence, the communication bore 19 is opened again to allow a pressure increase in the output hydraulic chamber 18. When this pressure reaches a certain level, the pressure receiving piston 14 operates again to block the communication bore 19 thereby to prevent further increase of the pressure in the output hydraulic chamber 18. This operation is repeated to progressively increase the braking hydraulic pressure in the left rear wheel brake Br.

On the other hand, the braking hydraulic pressure in the right front wheel brake Bf' is increased rapidly because this brake receives the output pressure of the master cylinder M directly.

The right rear wheel brake Br' is controlled in the same manner as the left rear wheel brake Br by the operation of the second reducing valve $V_2$, while the left front wheel brake Bf receives directly the output pressure from the master cylinder M as is the case of the right front wheel brake Bf'.

When the vehicle is braked abruptly, the load is shifted forwardly: namely, the front wheels are loaded more heavily than the rear wheel brakes to increase the tendency of locking of wheels, particularly the rear wheels. According to the invention, however, it is possible to effectively brake the vehicle without the fear of locking, because the front wheel brakes Bf and Bf' receive higher braking hydraulic pressure while the rear wheel brakes Br,Br' operate with a reduced braking hydraulic pressure.

In the first and second reducing valves $V_1$ and $V_2$, the pressure at which the pressure reducing operation is commenced is determined by the initial load on the pressure regulating spring 22, while the pressure reduction ratio is determined by the ratio of the cross-sectional area between the small-diameter end 15 and the large-diameter end 16 of the pressure-receiving piston 14.

According to the invention, it is possible to obtain a wide variety of the operating characteristics of the pressure reducing valve, i.e., the pressure at which the pressure reducing operation is commenced, pressure reduction ratio and so forth. To this end, the invention proposes to prepare a plurality of second half parts $2_2$ of an equal size and shape which are previously mounted with pressure receiving pistons of various sectional areas and pressure regulating springs 22 of various initial loads. It will be seen that, by screwing one of these second half parts $2_2$ to the common first half part $2_1$ after fitting the valve cylinder 23 to this second half part $2_2$, it is possible to construct a reducing valve having any desired pressure reducing characteristics. When the new second half part $2_2$ is screwed almost fully to the first half part $2_1$, the valve cylinder 23 is pressed by the second half part $2_2$ tending to rotate together with the latter. The valve spring 25, however, is not twisted because it is incorporated in the valve cylinder 23.

It is to be noted also that, since the valve member 24 and the valve spring 25 are prevented from coming off from the valve cylinder 23, the damaging or losing of these members due to accidental dropping can be eliminated advantageously. In addition, the handling of the valve member 24 and other member is easy to facilitate the work of demounting of the old second half part $2_2$ and mounting of a new second half part $2_2$.

It is to be noted further that, by fitting the valve cylinder 23 in the second half part $2_2$, the distance $S_2$ between the valve member 24 and the valve seat 36 is determined precisely. This clearance $S_2$ is never affected by a variation of the thickness of the sealing member 7 clamped between the first and second half parts $2_1$ and $2_2$.

Figure 6:
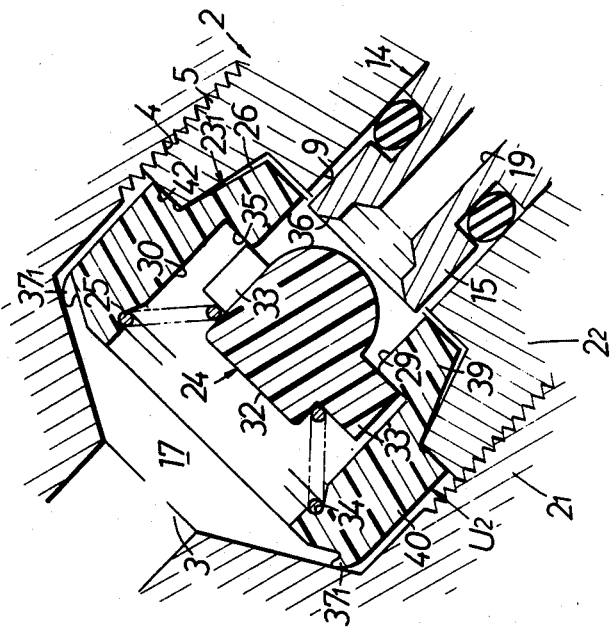
FIG. 6 is an enlarged sectional view of a part of a second embodiment of the invention.

FIG. 6 shows a second embodiment of the invention. In this embodiment, the valve cylinder $23_1$ is molded from synthetic resin to have a frusto-conical cylinderical portion 39 with the aforementioned tapered surface 26 and a cylindrical portion 40 leading from the large-diameter end of the frusto-conical cylindrical portion 39 and having an outside diameter greater than the latter. A plurality of resilient tabs $37_1$, which serve as a biasing spring, are formed integrally on the outer peripheral portion of the end surface of the cylindrical portion 40. These resilient tabs $37_1$ are formed by molding simultaneously with the molding of the valve cylinder $23_1$. The resilient tabs $37_1$ are pressed resiliently against the portion of the inlet 3 around the inner end wall thereof. With this arrangement, it is possible to eliminate the annular wave-shaped biasing spring 37 used in the first embodiment. Other portions of the second embodiment are materially identical to those of the first embodiment and, hence, are denoted by the same reference numerals as those in the illustration of the first embodiment.

Figure 7:
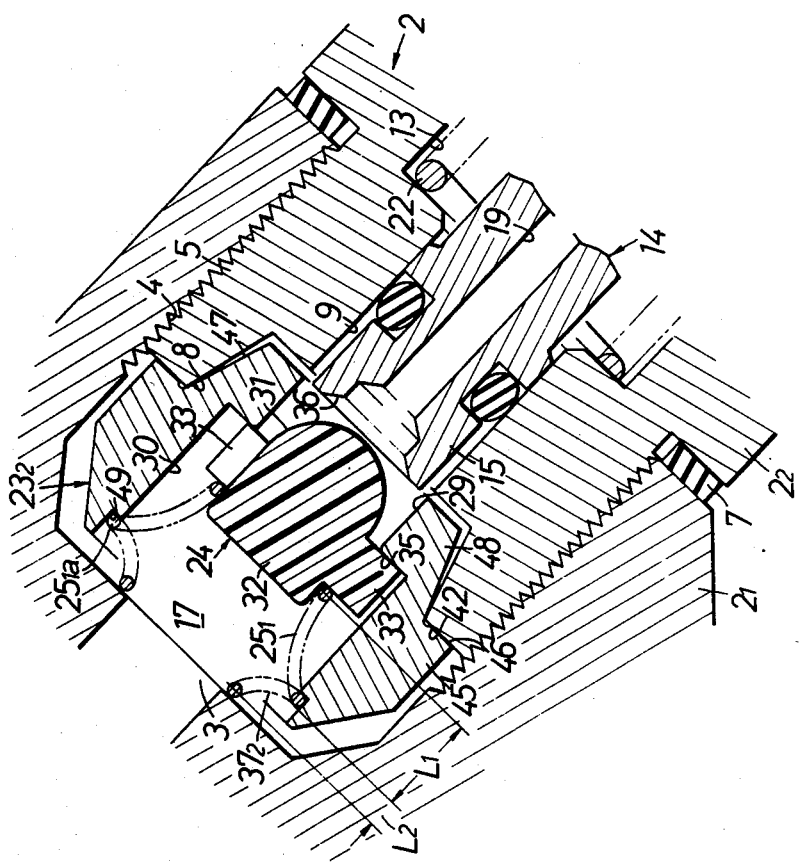
FIG. 7 is an enlarged sectional view of an essential part of a third embodiment of the invention.
Figure 8:
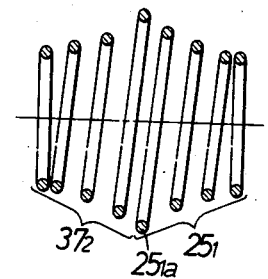
FIG. 8 is a sectional view of a structure consisting of the valve spring and biasing spring shown in FIG. 7.

FIGS. 7 and 8 in combination show a third embodiment of the invention which is mainly distinguished from the first embodiment by the following two points: namely, a first point that the valve cylinder $23_2$ is constituted by a cylindrical portion 45 and a frusto-conical cylindrical portion 48 projected from one end surface 46 of the cylindrical portion 45 and having a tapered outer peripheral surface 47, and a second point that a valve spring $25_1$ and a biasing spring $37_2$ are formed as an integral coiled spring which has two frusto-conical portions serving, respectively, as the valve spring $25_1$ and the biasing spring $37_2$, i.e., that the large-diameter end of the biasing spring $37_2$ is connected to the large-diameter end of the valve spring $25_1$. Other portions are materially identical to those of the first embodiment and are denoted by the same reference numerals as those used in the illustration of the first embodiment.

More specifically, in this embodiment of the invention, the valve spring $25_1$ and the biasing spring $37_2$ are arranged in symmetry with respect to the large-diameter end $25_1a$ of the valve spring $25_1$ as shown in FIG. 8. Namely, this coiled spring has the greatest diameter at the large-diameter end $25_1a$ of the valve spring $25_1$ and the diameter progressively decreases towards both axial ends of the coiled spring. With this arrangement, it is possible to prevent the valve spring $25_1$ and the biasing spring $37_2$ in wrong postures.

The large-diameter end $25_1a$ of the valve spring $25_1$ is retained by an annular step 49 formed on the inner peripheral surface of the large-diameter bore 30 formed in the valve cylinder $23_2$, while the small-diameter end of the same is retained by the bases of the retaining tabs 33 formed integrally on the valve member 24. Similarly, the base end of the biasing spring $37_2$ is retained by the peripheral edge of the inlet 3 formed in the wall of the input hydraulic chamber 17. Consequently, the valve spring $25_1$ is compressed between the valve member 24 and the valve cylinder $23_2$ and the biasing spring $37_2$ is compressed between the valve cylinder $23_2$ and the wall of the input hydraulic chamber 17. The length $L_1$ of the valve spring $25_1$ in the compressed state is greater than that $L_2$ of the biasing spring $37_2$ so that the biasing spring $37_2$ is initially loaded more heavily than the valve spring $25_1$. Consequently, the end surface 46 of the valve cylinder $23_2$ is pressed against the end surface 42 of the second half part $2_2$ to hold the frusto-conical cylindrical portion 48 in fitting state with the opening 8 of the second half part $2_2$. At the same time, retaining tabs 33 of the valve member 24 are pressed against the annular step 35 between the small-diameter bore 29 and the large-diameter bore 30, so that the valve member 24 is positioned correctly with respect to the valve seat 36 formed on the open end of the communication bore 19 in the pressure receiving piston 14.

Figure 9:
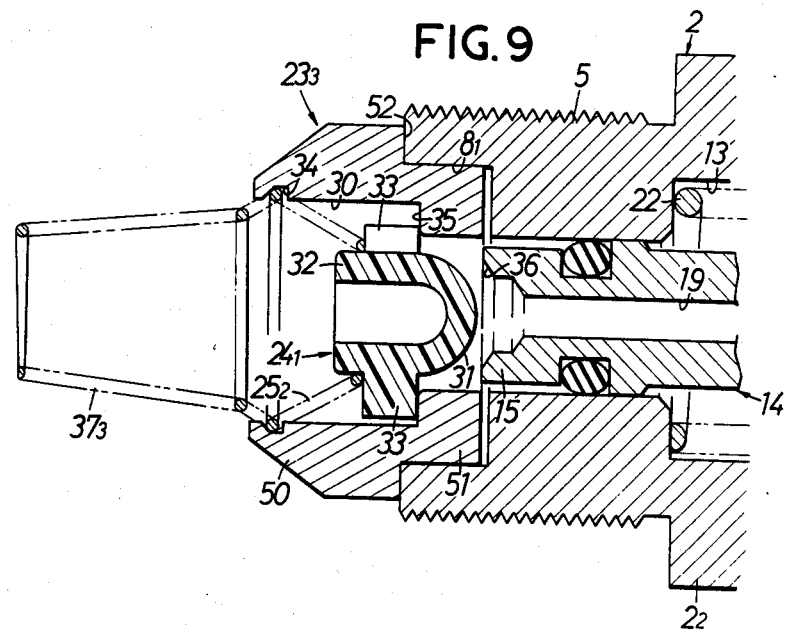
FIG. 9 is an enlarged sectional view of an essential part of a fourth embodiment of the invention.

FIG. 9 shows a fourth embodiment of the invention. In this fourth embodiment, the valve cylinder $23_3$ is constituted by a large-diameter cylindrical portion 50 and small-diameter cylindrical portion 51. The small-diameter cylindrical portion 51 fits in the opening $8_1$ of the second half part $2_2$, while a step 52 between the large-diameter portion 50 and the small-diameter portion 51 abuts the end surface of the opening $8_1$.

The valve member $24_1$ is made hollow and is provided with a plurality of retaining tabs 33. A frusto-conical valve spring $25_2$ is compressed between the bases of the retaining tabs 33 and an annular retaining groove 34 formed in the inner peripheral surface of the large-diameter bore 30 of the valve cylinder $23_3$. The retaining tabs 33 of the valve member $24_1$ abut the annular step 35 between the large-diameter bore 30 and the small-diameter bore 29 of the valve cylinder $23_3$. The large-diameter end of the valve spring $25_2$ is connected to the large-diameter end of the biasing spring $37_3$.

Owing to this arrangement, the valve spring $25_2$ and the valve member $24_1$ are mounted in the valve cylinder $23_3$ so that these three members in combination form a unit. Furthermore, since the biasing spring $37_3$ is formed integral with this unit., the assembling of the valve member $24_1$, valve spring $25_2$ and the biasing spring $37_3$ can be made easily simply by screwing the second half part $2_2$ to the first half part $2_1$.

In FIG. 9, the same reference numerals are used to denote the same parts or members as those used in FIG. 1.

In the third and the fourth embodiments of the invention, the diameters of the biasing springs $37_2$ and $37_3$ may be constant over their entire lengths.

What is claimed is:

1. A master cylinder-reducing valve assembly having a master cylinder and a reducing valve for transmitting an output hydraulic pressure from said master cylinder to a rear wheel brake at a reduced level, said reducing valve comprising: a valve housing mounted on said master cylinder and having an inlet communicating with an output port of said master cylinder and an outlet communicating with a rear wheel brake; a pressure receiving piston slidably received in said valve housing so as to divide an interior of said valve housing into an input hydraulic chamber communicating with said inlet and an output hydraulic chamber communicating with said outlet, said pressure receiving piston having a communication bore for connection between said input and output hydraulic chambers; a valve member disposed in said input hydraulic chamber and adapted alternately to open and close said communication bore during pressure reducing operation, a predetermined clearance being provided between the valve member and the pressure receiving piston; a valve spring for biasing said valve member toward said pressure receiving piston; a pressure regulating spring for biasing said pressure receiving piston away from said valve member; said valve housing consisting of a first half part having said inlet and formed integral with said master cylinder, and a second half part having said outlet and screwed to said first half part; a valve cylinder disposed between said first half part and said second half part, said valve cylinder accommodating therein said valve member and said valve spring thereby constituting a replaceable valve unit, said valve spring being compressed between said valve member and said valve cylinder to fix a position of the valve member relative to the valve cylinder during non-operation of the pressure reducing valve, said second half part accommodating therein said pressure receiving piston and said pressure regulating spring which is compressed between said pressure receiving piston and said second half part to fix a position of the pressure receiving piston relative to the second half part during non-operation of the pressure reducing valve; and a biasing spring compressed between said first half part and said valve cylinder to urge the valve cylinder into pressure contact with the second half part for fixing relative position therebetween.

2. A master cylinder-reducing valve assembly according to claim 1, wherein said valve spring consists of a frusto-conical coiled spring having a small-diameter end engaging with said valve member and a large-diameter end engaging in an annular retaining groove formed in an inner peripheral surface of said valve cylinder.

3. A master cylinder-reducing valve assembly according to claim 1 or 2, wherein said biasing spring has an annular wave-like form.

4. A master cylinder-reducing valve assembly according to claim 1 or 2, wherein said biasing spring is constituted by a plurality of resilient tabs which are formed integrally with said valve cylinder when said valve cylinder is molded from synthetic resin.

5. A master cylinder-reducing valve assembly according to claim 2, wherein said biasing spring consists of a coiled spring having one end connected to the large-diameter end of said valve spring.

6. A master cylinder-reducing valve assembly according to claim 1, wherein said valve spring consists of a frusto-conical coiled spring having a small-diameter end engaging with said valve member and a large-diameter end engaging in an annular retaining groove formed in an inner peripheral surface of said valve cylinder, and wherein said biasing spring consists of a frusto-conical coiled spring having a large-diameter end connected to the large-diameter end of said valve spring.

7. A master cylinder-reducing valve assembly according to claim 6, wherein said biasing spring and said valve spring are formed integrally and insymmetry with each other with respect to a portion where they are connected to each other.

8. A master cylinder-reducing valve assembly according to claim 1, wherein said master cylinder is of a tandem type and is connected to front and rear left and right wheel brakes through diagonally formed oil lines, said master cylinder being associated with two reducing valves which have same structure and adapted to feed output hydraulic pressures from said master cylinder to said rear left and right wheel brakes, respectively, at a reduced level.

9. A master cylinder-reducing valve assembly according to claim 1, wherein said valve cylinder is fitted into an opening provided on the second half part on a side closer to said first half part.

* * * * *